United States Patent
Gross

4,016,493
Apr. 5, 1977

[54] SIMPLIFIED LAND LINE AND SATELLITE COMMUNICATION SWITCHING SYSTEM

[75] Inventor: William B. Gross, Havertown, Pa.

[73] Assignee: General Electric Company, Fairfield, Conn.

[22] Filed: Oct. 22, 1975

[21] Appl. No.: 624,955

[52] U.S. Cl. .............................. 325/4; 179/15 FD
[51] Int. Cl.² ................... H04B 1/50; H04B 7/185; H04B 7/24; H04J 1/10
[58] Field of Search ........................... 325/3, 4, 21; 179/15 FD, 2.5 R

[56] References Cited
UNITED STATES PATENTS

| | | | |
|---|---|---|---|
| 3,065,420 | 11/1962 | Close ....................................... | 325/3 |
| 3,809,815 | 5/1974 | Reed ................................. | 179/2.5 R |
| 3,809,816 | 5/1974 | Reed ................................. | 179/2.5 R |
| 3,842,350 | 10/1974 | Gross ..................................... | 325/4 |
| 3,866,178 | 2/1975 | Muller ........................... | 179/15 FD |
| 3,912,876 | 10/1975 | Muller ........................... | 179/15 FD |

*Primary Examiner*—Howard W. Britton
*Attorney, Agent, or Firm*—Allen E. Amgott; Raymond H. Quist

[57] ABSTRACT

Ground terminal serving a number of individual telephone lines in a local region converts their signals to an intermediate frequency. If called station is in remote region linked by relay satellite, intermediate frequency is selected in band dedicated to conversion to (or from) satellite frequency band by frequency converters. If called station is in local region, intermediate frequency is selected in a different band dedicated to local traffic. Frequency-selective filters automatically route signals in satellite-dedicated intermediate frequency band to (or from) satellite-linked channels, and signals in local-traffic-dedicated intermediate frequency band to a channel common to local lines, eliminating need for switching between two kinds of channels. Two local-region telephone lines may be linked by appropriate intermediate-frequency assignments, thus performing function equivalent to ordinary telephone exchange.

4 Claims, 3 Drawing Figures

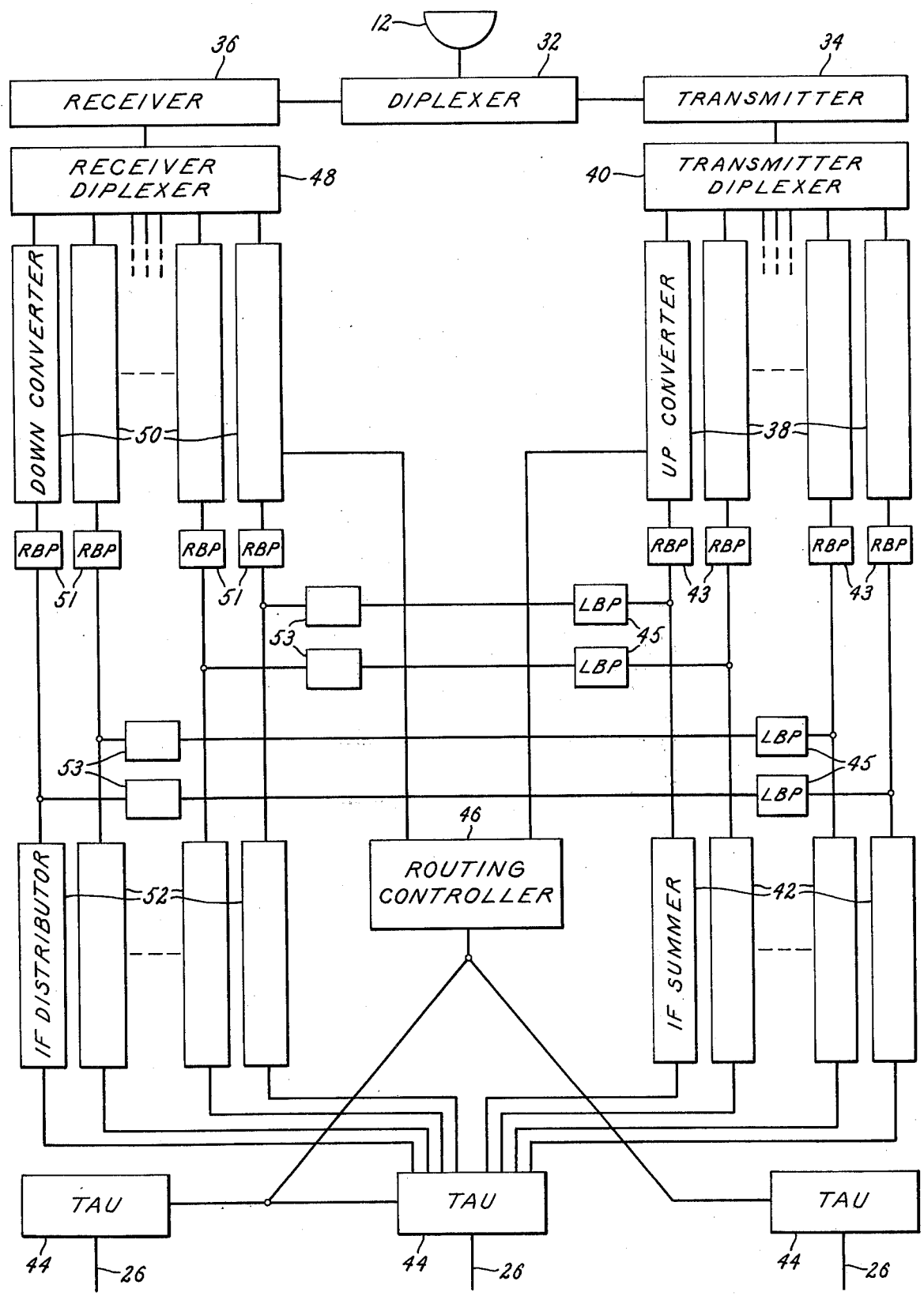

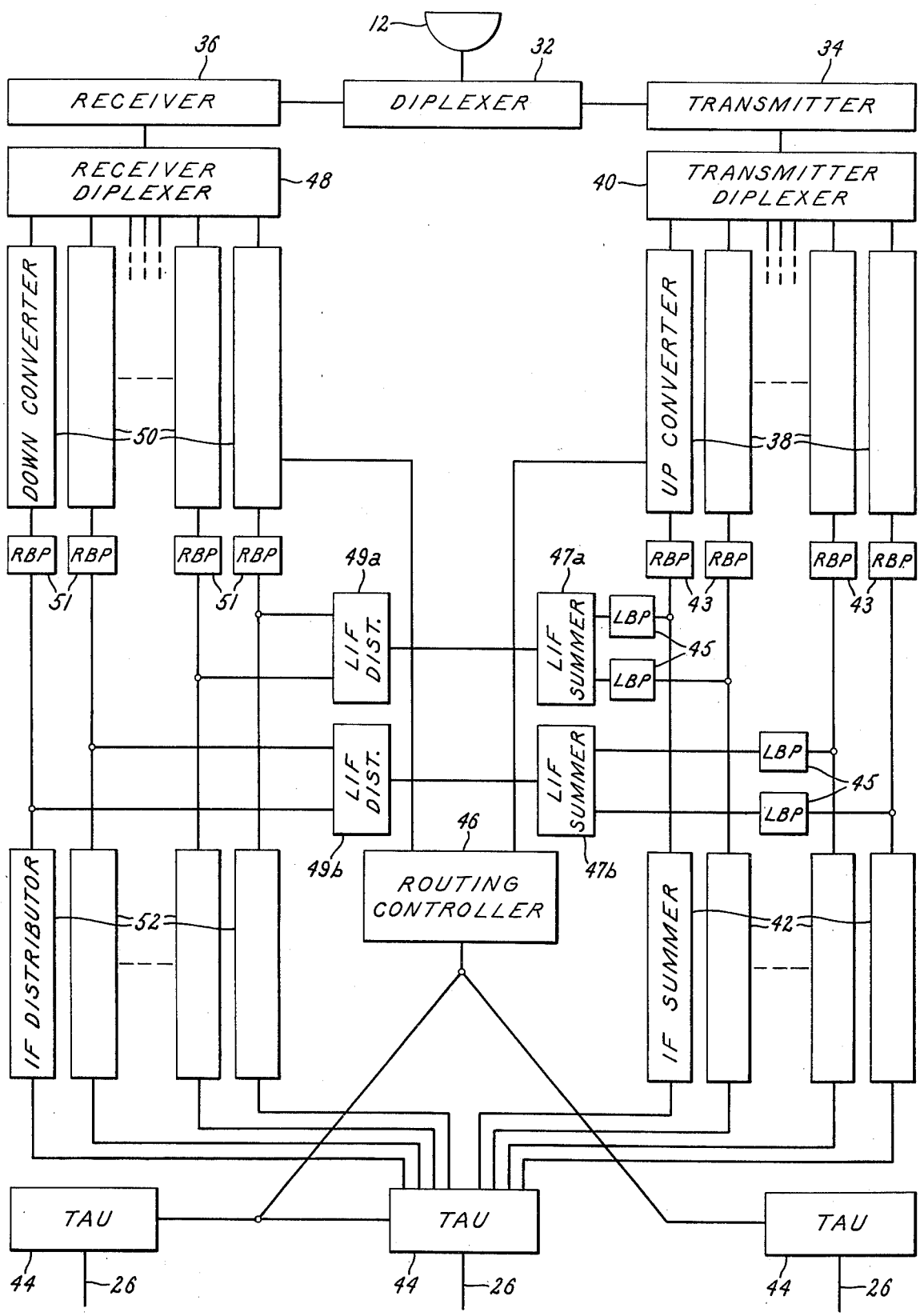

SIMPLIFIED LAND LINE AND SATELLITE COMMUNICATION SWITCHING SYSTEM

BACKGROUND OF THE INVENTION

1. Field of the Invention

This invention pertains to communication switching systems, particularly to those for interconnecting a plurality of individual stations both with the local and satellite-linked other stations.

2. Background of the Invention

The prior art most directly related to the present invention is the inventor's U.S. Pat. No. 3,842,350, which is assigned to the assignee of the present application, and is included herein by reference. That patent teaches the provision, for each individual subscriber line or trunk, of a trunk access unit, abbreviated to TAU, which has frequency conversion means to convert incoming signals (from subscriber) to an intermediate frequency which is determined by the frequency of a programmable local oscillator, whose frequency is determined by digital control signals from a routing controller. Cognate equipment in the TAU has a similar programmable local oscillator whose frequency determines the received intermediate frequency which will be demodulated to an outgoing signal to subscriber. The intermediate frequencies used cover a band which may be less than the total band used for communication with the satellite. Therefore a number of up-converters may be provided to receive intermediate-frequency signals and convert them to a frequency lying in a particular part of the total band used to transmit to the satellite. Each TAU is provided with a switching system to connect its intermediate-frequency output to a selected up-converter. Similarly, a number of down-converters may be provided to select a particular part of the total band used to receive from the satellite; the TAU has a second switching system to connect its intermediate-frequency input to a selected down-converter. In the referenced patent one channel in each of the TAU switching systems is connected to a bus-type channel common to all of the local TAUs, so that the interconnection of two local TAUs requires a switching operation in addition to appropriate intermediate-frequency assignment. In the patented system, it is contemplated that the same intermediate-frequency band will be used both for communication via the satellite with remote TAUs, and for communication between local TAUs. The assignment of intermediate frequencies and, for satellite-relayed calls, of the particular up-converter and down-converter to be used, is controlled locally by a data-processing device known as a routing controller, which may be directed by control signals from a system routing center located at one ground station in a system of ground stations. Information on the frequency assignments currently in actual use is maintained by the data-processing equipment and unused frequencies are assigned at need. Thus there is no frequency particularly assigned to a given TAU, except for the duration of a given call. Since only a fraction of all TAUs will ordinarily be in use at any given time, this permits fuller utilization of the available frequency spectrum.

U.S. Pat. Nos. 3,809,815 and 3,809,816, of Reed et al. teach a system in which a plurality of telephones are connected to a common broadband channel, such as a coaxial cable, with a transmitting or receiving frequency permanently assigned to each telephone. Connection between two telephones is made by suitably adjusting the receiving or transmitting frequency of one to correspond to the receiving or transmitting frequency of the other telephone. There is no suggestion of interconnection via a satellite or other relay, or of the use of up or down converters to cover a band broader than the band of intermediate frequencies employed.

U.S. Pat. No. 3,065,420, of Close, discloses a transmission system operating at intermediate, or converted, frequencies in which reliability is improved by an unusual form of redundancy. Two different information signals are both fed to two different modulators. Each modulator is connected to a different demodulator, and in normal operation one signal is selected from each demodulator. However, the transmission channels for the intermediate frequencies are cross connected so that, in an emergency caused by failure of either modulator, or either demodulator, both signals will be transmitted, and both may be demodulated, from a single demodulator if need be. This is completely different in use, concept, and teaching from the present invention.

No prior art is known to the applicant in which signals at intermediate frequency are directed to local common channels or to satellite relay channels by frequency selectivity of permanently connected ties to the two channels.

SUMMARY OF THE INVENTION

In U.S. Pat. No. 3,842,350, which is incorporated herein by reference, it is taught to connect an individual telephone line or similar individual service to a trunk access unit which can, responsively to signals from a centralized controller, convert its audio signals to intermediate frequencies individually assigned for a particular call. These TAUs also, responsively to signals from the same source, connect their intermediate-frequency channels to one of a plurality of up and down frequency converters, or to a common local intermediate-frequency channel. The latter permits interconnection of two local lines in a manner similar to the operation of an ordinary telephone exchange.

The present invention eliminates the necessity of switching the TAU to the common local intermediate-frequency channel. Intermediate frequencies assigned for local calls lie outside of the band used for connection with the up and down converters. The TAU is permanently connected to a local intermediate-frequency channel through a filter which passes the intermediate frequencies dedicated to local calls, and rejects those frequencies used for connection to the up and down converters. The TAU switching system which connects to the various up and down converters is connected to the TAU, permanently, through a filter which passes the intermediate frequencies dedicated to use with the converters, and rejects those dedicated to local calls. This saves one switch terminal on each TAU switch, and eliminates, for local call command signals, the part which is the direction to the TAU switch. It also permits a system organization in which the local routing controller is caused to assign intermediate frequencies for local calls, and merely informs the system routing center that certain TAUs are busy. This eliminates a certain amount of communication between the local routing controller and the system routing center. In the system of the referenced patent, the system routing center must receive from the local routing controller a request for intermediate frequency assignments even for local calls, and must reply with the assignments. Except for the ground station at which the system routing center is located, this normally must be done via satellite, which is relatively expensive. The present invention permits the elimination of much of this traffic; its effect in this respect is particularly great if the proportion of local calls is high.

There are two distinct embodiments of this invention. In one, all locally generated intermediate-frequency signals in what may be called the local IF band (as distinct from the relay IF band) are buffed together to a common bus-type channel which is then distributed to all local receivers. This arrangement allows any two TAUs to be tied together by proper frequency assignments in the local IF band, without regard to the particular up converter or down converter to which they may be connected. Consequently, the local capacity is limited by the local IF bandwidth. For a suitably small local call load relative to the relayed call load, this will be the preferred method.

The second embodiment provides for a higher local call load than the first, and the expense of one possible additional switching operation. In it the intermediate-frequency signals directed to a single up converter have their local IF signals filtered out and connected to the distributor which receives the relayed signals from a signal down converter. Local communication can then be established only from a TAU connected to the particular up converter to a TAU connected to the particular down converter. But if there are N up converters and N down converters, the local call capacity is N times that permitted by the local IF bandwidth in a single channel; but it may be necessary to perform a switching operation to put either the calling TAU or the called TAU on the appropriate converter channels.

These two embodiments may be hybridized to meet appropriate local call loads. If there are, e.g. six up converters and six down converters, one local IF tie may extend between up converters 1 and 2 to down converters 1 and 2, another similarly between up and down converters numbered 3 and 4, and likewise for converters numbered 5 and 6. Or, for slightly less heavy local call loads, converters numbered 1, 2, and 3 may be tied together at local IF frequency and converters numbered 4, 5, and 6 may similarly be tied together.

BRIEF DESCRIPTION OF THE DRAWINGS

FIGS. 1 and 2 represent two different embodiments of my invention.

FIG. 3 represents a third embodiment of my invention which is essentially a hybrid combination of the two preceding ones.

DESCRIPTION OF THE PREFERRED EMBODIMENTS

Figure 1:
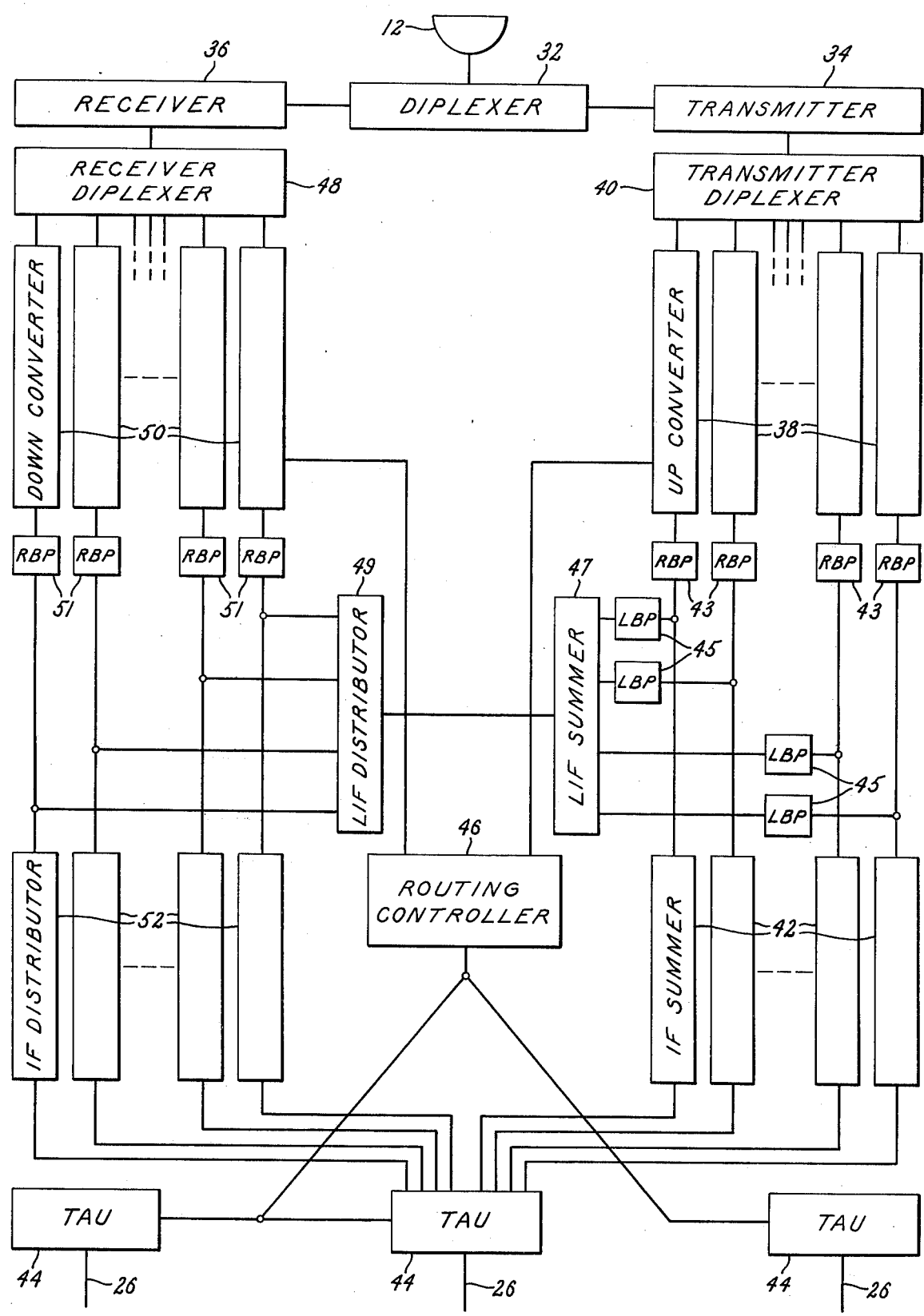

FIG. 1 represents a first embodiment of my present invention; it is in large measure like FIG. 2 of U.S. Pat. No. 3,842,350, and the reference numbers used in the latter drawing having been retained. The present FIG. 1 differs from FIG. 2 of the patent in that IF summer 58 and IF distributor 54, and the connection between them and their connections to the TAU switching matrix have all been eliminated; and references 43, 45, 47, 49, and 51 have been added. References 43, marked RBP to signify "relay band pass" are filters which pass the intermediate frequencies used for communication via the relay and reject the intermediate frequencies used for local communication. Filters 45, marked LBP to signify "local band pass" pass the intermediate frequencies used for local communication and reject those used for relay communication. The outputs of filters 45 go to local IF summer 47, which is a buffer similar to IF summers 42 but has a less stringent bandwidth requirement in that it need pass only the IF band used for local communication, while IF summers 42 must pass the relay and local IF bands.

The output of LIF summer 47 is transmitted to LIF distributor 49, which is an isolator similar to IF distributors 52, and distributes the output of LIF summer 47 to the inputs of all IF distributors 52. As a practical matter, power gain will presumably be required somewhere in the channel from local band pass filters 45 to IF distributors 52. This may be provided by an amplifier located between LIF summer 47 and LIF distributor 49; or LIF distributor 49 may comprise buffer elements having gain. This is a matter of design choice among a number of known art alternatives.

The mode of operation of the embodiment of FIG. 1 is the following: If any TAU 44 is to transmit via satellite relay, it is assigned an IF lying in the relay IF band. No matter which IF summer 42 is connected to the particular TAU 44, the TAU output will pass through an IF summer 42, be rejected by a local band pass filter 45, and pass a relay band pass filter 43 to an up converter 38. Similarly an incoming signal from a down converter 50 will pass relay band pass filter 51 to its associated IF distributor 52 and thence to the demodulator portion of the appropriate TAU.

If a TAU 44 is to communicate with another local TAU, it is assigned a transmitting frequency in the local IF band, outside of the relay IF band. Its output will then pass through an IF summer 42 to the associated local band pass filter 45 (being at the same time rejected by relay band pass filter 43, outside of whose pass band it lies), thence to LIF summer 47 and to LIF distributor 49. The input to LIF distributor 49 will be passed to the inputs of all IF distributors 52 and thence to every TAU, being received, of course, by the TAU whose demodulator is tuned to receive it.

While RBP 51 has been described as a relay IF band pass filter, its function is primarily to serve as an isolator of the output of its associated down converter 50 from the signals from LIF distributor 49. It may be replaced by any other conventional isolator, such e.g. as an buffer; or if the output of the down converter 50 itself is of such nature as to constitute a buffer it may not be required at all.

Consideration of the embodiment of FIG. 1 shows that for relayed calls, it operates like its cognate of the referenced patent; but for local calls it requires only assignment of mated transmitting and receiving local intermediate frequencies to any two TAUs to connect them together, regardless of the IF summer 42 and IF distributor 52 to which each one is connected; but the capacity of the local call system is set by the width of the local IF band.

FIG. 2 represents a second embodiment of my invention. In it the function of relay band pass filters 43 and local band pass filters 45 is the same as in FIG. 1. Relay band pass filters 51 are also isolators of the outputs of their associated down converters from the local IF inputs, and may have other forms or be unnecessary. References 53 may be filters or other types of isolators or buffers as required to prevent interaction between the outputs of down converters 50 and the outputs of local band pass filters 45. The distinctive difference between the present embodiment and that of FIG. 1 is the absence of LIF summer 47 and LIF distributor 49. In FIG. 2 there is a one-to-one relation between each IF summer 42 and and IF distributor 52. This requires that a TAU which is to receive a local IF signal which has passed a given IF summer 42 must be connected to the proper IF distributor 52. This may require a switching operation for even local calls; but the profit in this is that the entire local IF spectrum is available for separate use through every IF summer. The local traffic capacity is thus N times as great as that of the embodiment of FIG. 1, where N is the number of IF summers 42.

If the basic communication system is for such limited capacity that it uses only one IF summer 42, up converter 32, and one down converter 50 and IF distributor 52, the two embodiments shown degenerate into one, since in such case the TAU 44 would not require connection to a switching matrix but would always remain connected to the one IF summer 42 and the one IF distributor 52.

FIG. 3 represents, largely for completeness, the hybrid combination of the embodiments of FIGS. 1 and 2. The original LIF summer 47 is divided into two summers 47A and 47B, each connected to two local band pass filters 45; and LIF distributor 49 is correspondingly divided into two distributors 49A and 49B, each connected to two different IF distributors 52. This obviously will give double the local traffic capacity of the embodiment of FIG. 1, at the cost of possible need to switch the TAU connections for half the local calls (statistically).

In the generic teminology necessary to distinctly point out the invention, the combination of relay band pass filter 43 and local band pass filter 45 has been described as frequency-selective means. This is necessary because, while for clarity separate elements have been shown, the filter art commonly combines two filters for passing different bands into what is actually a single element.

I claim:
1. The method of switching a plurality of access lines to each other and to satellite relay channels which comprises in combination:
 1. converting the signals from a first said access line to a first selected intermediate frequency lower than the frequency of a satellite relay channel and lying in a relay intermediate frequency band;
 2. connecting the said first intermediate frequency signals, by frequency-selective means for transmitting signals in the relay intermediate frequency band and attenuating signals outside of the relay intermediate frequency band, to a frequency converter to change them to a first satellite relay channel frequency for relay by the satellite and
 3. converting the signals from the first said access line to a second selected intermediate frequency lower than the frequency of a satellite relay channel and lying in a local intermediate frequency band outside of the relay intermediate frequency band;
 4. transmitting the said second intermediate frequency signals, by frequency-selective means for transmitting signals in the local intermediate frequency band and attenuating signals outside of the local intermediate frequency band, to an intermediate frequency demodulator tuned to the said second intermediate frequency and connected to a second said access line for transmission of the said signals from the first said access line to the second said access line;
 5. converting the signals from a second said access line to a third selected intermediate frequency lower than the frequency of a satellite relay channel and lying in a relay intermediate frequency band;
 6. connecting the said third intermediate frequency signals, by frequency-selective means for transmitting signals in the relay intermediate frequency band and attenuating signals outside of the relay intermediate frequency band, to a frequency converter to change them to a second satellite relay channel frequency for relay by the satellite and
 7. converting the signals from the second said access line to a fourth selected intermediate frequency lower than the frequency of a satellite relay channel and lying in a local intermediate frequency band outside of the relay intermediate frequency band;
 8. transmitting the said fourth intermediate frequency signals, by frequency-selective means for transmitting signals in the local intermediate frequency band and attenuating signals outside of the local intermediate frequency band, to an intermediate frequency demodulator tuned to the said fourth intermediate frequency and connected to the first said access line for the transmission of the said signals from the second said access line to the first said access line;
 9. converting signals at a satellite relay channel frequency to intermediate frequency signals in the relay intermediate frequency band and transmitting the said intermediate frequency signals to an intermediate frequency demodulator tuned to the said signals and connected to the said first access line for transmission of the said signals, after demodulation, to the said first access line; and
 10. converting signals at a satellite relay channel frequency to intermediate frequency signals in the relay intermediate frequency band and transmitting the said intermediate frequency signals to an intermediate frequency demodulator tuned to the said signals and connected to the said second access line for transmission of the said signals, after demodulation, to the said second access line.

2. In a primary station of a relay communication system which station comprises:
 a. a plurality of transmitting intermediate frequency means each connected to receiving signals from an access line and to convert them to a modulated signal at an intermediate frequency lying in an intermediate frequency band, comprising:
  1. modulator means,
  2. controllably programmable oscillator means programmable by control signals to oscillate at a frequency effective to produce the said modulated signal at an intermediate frequency determined by the said control signals;
 b. transmitting frequency converter means to receive the said modulated signals lying in the said intermediate frequency band and to translate them in frequency to lie within a band assigned to relay the said modulated signals to another primary station;
 c. a plurality of receiving intermediate frequency means each connected to receive modulated signals lying in the said intermediate frequency band and to demodulate a modulated signal and transmit the demodulated signal to an access line, comprising:
1. demodulator means;
2. controllably programmable oscillator means programmable by control signals to oscillate at a frequency effective to cause the demodulator means to demodulate a signal at an intermediate frequency determined by the control signals;
d. receiving frequency converter means to receive modulated signals lying within a frequency band assigned to relay modulated signals from another primary station and to translate them in frequency to lie in the said intermediate frequency band;
e. means to connect transmitting intermediate frequency means to transmitting frequency converter means for relaying of modulated signals to another primary station and to connect them to receiving frequency converter means for transmitting modulated signals within the same primary station;
f. means to connect receiving intermediate frequency means to receiving frequency converter means for receiving modulated signals relayed from another primary station and to connect them to receive modulated signals from transmitting intermediate frequency means within the same primary station;
the improvement in which e) above comprises:
g. frequency-selective means connected to transmitting intermediate frequency means and to transmitting frequency converter means and to receiving frequency converter means to
  1. receive from transmitting intermediate frequency means modulated signals lying in a relay intermediate frequency band and modulated signals lying in a local intermediate frequency band different from the relay intermediate frequency band;
  2. transmit to the transmitting frequency converter means signals lying in the said relay intermediate frequency band and reject signals lying in the said local intermediate frequency band; and
  3. transmit to receiving frequency converter means signals lying in the said local intermediate frequency band and reject signals lying in the said relay intermediate frequency band.

3. The invention claimed in claim 2 in which:
h. the primary station comprises a plurality of transmitting frequency converter means and a plurality of receiving frequency converter means; and
i. the improvement comprises a plurality of frequency-selective means each of which is connected to transmit signals lying in the relay intermediate frequency band to only one of the said plurality of transmitting frequency converter means, and to transmit signals lying in the local intermediate frequency band to only the receiving frequency converter means which are connected also to receive signals lying in the relay intermediate frequency band from only one of the said plurality of receiving frequency converter means.

4. The invention claimed in claim 2 in which:
j. the primary station comprises a plurality of transmitting frequency converter means and a plurality of receiving frequency converter means; and
k. the improvement comprises a plurality of frequency-selective means each of which is connected to transmit signals lying in the relay intermediate frequency band to one of the said plurality of transmitting frequency converter means, and to transmit signals lying in the local intermediate frequency band to all the receiving frequency converter means.

* * * * *